United States Patent Office 3,244,285
Patented Apr. 5, 1966

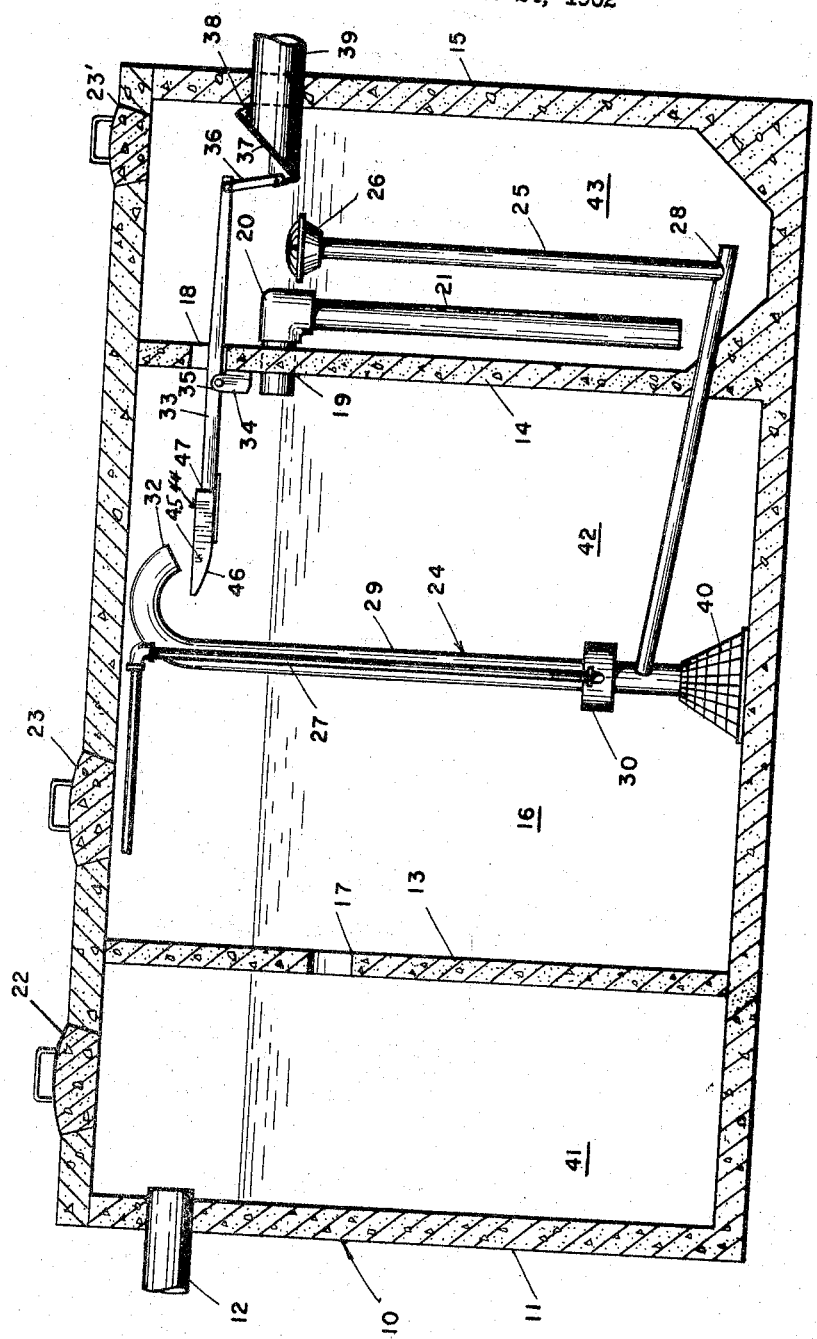

3,244,285
ENFORCED OPERATION TREATMENT TANK
Robert D. Allen, 379 Niles-Cortland Road SE.,
Warren, Ohio
Filed Oct. 24, 1962, Ser. No. 232,813
7 Claims. (Cl. 210—143)

This invention relates to liquid treating machines and, more particularly, to machines for treating sewage from domestic homes.

Individual sewage disposal units having aeration means therein have been generally unsuccessful because the liquids continue to flow untreated through the tank when the aeration means cease to function.

In the present invention, a splash plate is provided which is connected to a valve at the outlet and the valve controls the outlet from the tank. The splash plate is actuated by liquid circulated by the aeration pump in the treatment plant. Therefore, if the aeration pump stops, the splash plate will be no longer actuated and no liquid can flow through the tank until the aeration pump is restarted.

It is, accordingly, an object of the present invention to provide an improved plant for treating sewage.

Another object of the invention is to provide a treatment plant for sewage having an aeration pump therein and an outlet having a valve means controlled by the aeration pump.

A further object of the invention is to provide an improved sewage disposal plant.

A still further object of the invention is to provide a sewage disposal plant which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The single figure of drawing shows a longitudinal cross sectional view of a sewage disposal plant according to the invention.

Now with more particular reference to the drawing, a tank 10 is shown having an inlet end 11 with an inlet pipe 12 therein suitable for connecting to the waste pipe from a dwelling. A first partition 13 and a second partition 14 separate the tank 10 into a trash trap chamber 41, an aeration chamber 42, and a final chamber 43.

An outlet end 15 of the tank 10 has an outlet pipe 39 therein which may be connected to and discharge into a drainage field or to a sewer or other outlet. The tank 10 has lateral sides 16 which, with the inlet end 11 and the outlet end 15, form a tank. The tank has a top which is closed by removable covers 22, 23, 23'.

The trash chamber 41 may, for example, have a capacity of approximately two hundred fifty gallons. The aeration chamber 42 may have a capacity of five hundred gallons and the final chamber 43 may have a capacity of two hundred gallons.

It will be noted that the trash chamber 41 and aeration chamber 42 are connected together through the partition 13 by a port 17 so that liquid in the chamber 41 must rise to the level of the port 17 before it will flow through port 17 and enter the aeration chamber 42. Then liquid will continue to rise until it overflows through an outlet 19 and a pipe 21 to the bottom of the chamber 43. The chamber 43 will continue to collect liquid until it reaches the level of the outlet pipe 39. Since the bottoms of the outlet pipe 39 and the outlet 19 are on a common level, this will determine the level of the liquid in all three chambers of the tank in normal operation.

An aeration pump 24 is similar to that disclosed in my copending patent application, Serial No. 219,532, filed August 27, 1962. It is made up of a vertical pipe 29 which has a collar 30 disposed around it near its lower end. The space between the collar 30 and pipe 29 acts as a manifold. The air in the manifold is connected to the inside of the pipe 29 by means of circumferentially spaced holes which are disposed at an angle to the horizontal inclining upward as disclosed in the said application. This space between the collar and pipe is connected to an air pipe 31 which is, in turn, connected to a supply pump which supplies air under pressure to a pipe 27. The vertical pipe 29 terminates at its upper end in a curved pipe 32 which directs water onto a splash plate 44. The splash plate 44 is fixed to the distal end of a lever 33.

The lever 33 is pivoted at 35 to brackets 34 and is connected at its opposite end to a link 36 which, in turn, is connected to a check valve closure 37. The check valve closure 37 is hinged at 38 to the outlet pipe 39 so that when water from pipe 32 impinges on the splash plate, the plate will be urged to move down and the other end of the lever 33 will lift the check valve closure 37 and open it. When the lever 33 swings downwardly, it will close the closure 37 and the pipe 39.

It will be noted than when closed, the check closure 37 is disposed at approximately an angle of forty-five degrees to the vertical so that gravity will swing the check closure 37 closed.

The splash plate 44 may be in the form of a container having side walls 45, an inclinded bottom 46, and an end wall 47. Thus, the splash plate forms a container which will accumulate a weight of liquid from the curved pipe 32. This weight of liquid will overbalance the lever 33 and swing it and the check closure 37 open during normal operation. The discharge of liquid from the curved pipe 32 impinging on the splash plate will also diffuse the liquid and thereby aerate it further. It will also hold the check closure open during the time that the pump is operating.

A skimmer pipe 25 has a strainer 26 on the upper end thereof which skims any floating material from the top of the final chamber 43 and returns it through the aeration pump back onto the splash plate 44. The skimmer pipe 25 is connected through a pipe 28 to the bottom of the pipe 29 so that the sludge which is skimmed from the top of the final chamber is returned and re-aerated through the aeration pump. Liquid is drawn from the bottom of the aeration chamber through a screen 40 and thence out through the curved pipe 32 onto the splash plate where it is further aerated.

It will be seen that liquid entering the tank 10 from the inlet pipe 12 will flow through the port 17 into the aeration tank formed by sides 16 and from thence through the outlet 19 into the final chamber 43. The liquid level will rise until it reaches the level of the bottom of the outlet pipe 39. Then if the aeration pump 24 is operating, the air flowing through the pipe 27 and through the small openings into the pump 24 will lift fluid through the screen 40 and through the strainer 26 and discharge it through the curved pipe 32 onto the splash plate 44. As the liquid accumulates in the container made up of the side walls 45, bottom 46, and end wall 47, the weight of the water in the container will swing the lever 33 around its pivot 35 and open the closure 37. Then as liquid continues to rise in the tank, it will flow out through the discharge outlet pipe 39.

Should the aeration pump 24 be stopped for any reason, the impact on the splash plate will stop and since no water will accumulate in the container on the splash plate, the splash plate will move up and will allow the lever 33 to swing upward and the end attached to closure 37 will swing down due to the weight of the closure 37. The closure 37 will close the outlet pipe 39 so that no liquid will flow through the tank until the aeration pump is again started. When the aeration pump is again started, liquid will accumulate in the container at the end of the lever 33 and again open the closure 37.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A device for treating liquids comprising a tank having an aeration compartment and a final compartment, inlet means in said tank communicating with said aeration compartment, a partition in said tank between the compartments, an overflow opening in said partition adjacent an upper portion thereof communicating said aeration compartment with said final compartment, aeration means in said aeration compartment, an outlet in said tank in communication with said final compartment, means in said tank operating the aeration means, closure means on said outlet, means in said device for opening and closing said closure means on said outlet, said opening and closing means including means spaced from and adapted to be actuated by said aeration means, said aeration means, said means spaced from said aeration means, said opening and closing means, and said closure means being so constructed and arranged so that said closure means is held open when said aeration means actuates said opening and closing means and held closed when said aeration means ceases to actuate said opening and closing means.

2. The device recited in claim 1 wherein said aeration means comprises a generally vertically extending pipe, compressed air means for admitting air into the interior of said vertical pipe, and means to admit liquid from the bottom of said aeration compartment to said pipe whereby said liquid is circulated from the bottom of said aeration compartment to the top thereof to aerate and circulate said liquid.

3. The device recited in claim 2 wherein said means for opening and closing said closure means comprises a lever connected at an end to said closure means, said one end of said lever being in said final compartment and the other end of said lever being in said aeration compartment, and wherein said means spaced from said aeration means comprises a container mounted on the end of said lever in said aeration compartment, said aeration means being adapted to discharge liquid into said container whereby the discharged liquid overbalances said lever and said closure means is held open.

4. The device recited in claim 3 wherein a skimmer pipe is disposed in said final compartment, said skimmer including a screen on the upper end of said skimmer pipe, said screen being disposed substantially on a level with the bottom of said outlet, means connecting said skimmer pipe to the bottom of said aeration means whereby liquid is circulated from the top of said final compartment to the bottom of said vertical pipe.

5. The device recited in claim 1 wherein said aeration compartment communicates with said final compartment by means of a pipe in said partition, one end of said pipe communicating with said aeration compartment adjacent the top of said partition and the other end of said pipe communicating with said final compartment adjacent the bottom of said partition.

6. A device for treating sewage comprising a tank having an inlet and an outlet, two spaced partitions in said tank dividing said tank into a trash trap, an aeration chamber, and a final chamber, said aeration chamber being disposed between said trash trap and said final chamber, said inlet being in communication with said trash trap and said outlet being in communication with said final chamber, a first opening through one of said partitions and communicating said final chamber with said aeration chamber, the bottom of said opening being substantially level with the bottom of said outlet, a second opening through said other partition and communicating said trash trap and said aeration chamber and disposed below the level of said first opening, a closure means on said outlet, said closure means being disposed at approximately forty-five degrees to the horizontal when in a closed position, a lever extending through said one partition, one end of said lever being in said final chamber and being connected to said closure means and the other end of said lever being disposed in said aeration chamber and having a splash plate thereon, and aeration means in said aeration chamber, said aeration means being adapted to discharge liquid from the bottom of said aeration chamber onto said splash plate, said aeration means, said splash plate, said lever, and said closure means, being so constructed and arranged whereby said closure means is held open when said aeration means is discharging liquid and held closed when said aeration means ceases to discharge liquid.

7. The device recited in claim 6 wherein said splash plate has a container thereon.

References Cited by the Examiner

UNITED STATES PATENTS

| | | | |
|---|---|---|---|
| 646,929 | 4/1900 | Cameron et al. | 210—103 |
| 729,348 | 5/1903 | Hutchinson | 210—97 |
| 870,027 | 11/1907 | Gross | 210—109 |
| 1,223,427 | 4/1917 | Scarborough | 210—207 X |
| 1,252,099 | 1/1918 | Donovan | 210—115 X |
| 2,090,384 | 8/1937 | Durdin | 210—197 |
| 2,186,371 | 1/1940 | Durdin | 210—221 X |
| 2,323,437 | 7/1943 | Yeomans et al. | 210—197 |
| 2,384,972 | 9/1945 | Smalley | 210—275 X |
| 2,638,444 | 5/1953 | Kappe | 210—220 X |
| 2,987,186 | 6/1961 | Burgoon et al. | 210—197 |
| 3,053,390 | 9/1962 | Wood | 210—198 X |
| 3,126,333 | 3/1964 | Williams | 210—256 X |

FOREIGN PATENTS 524,858 8/1940 Great Britain.

REUBEN FRIEDMAN, *Primary Examiner.*

ROBERT E. BURNETT, *Examiner.*